Patented Apr. 19, 1949

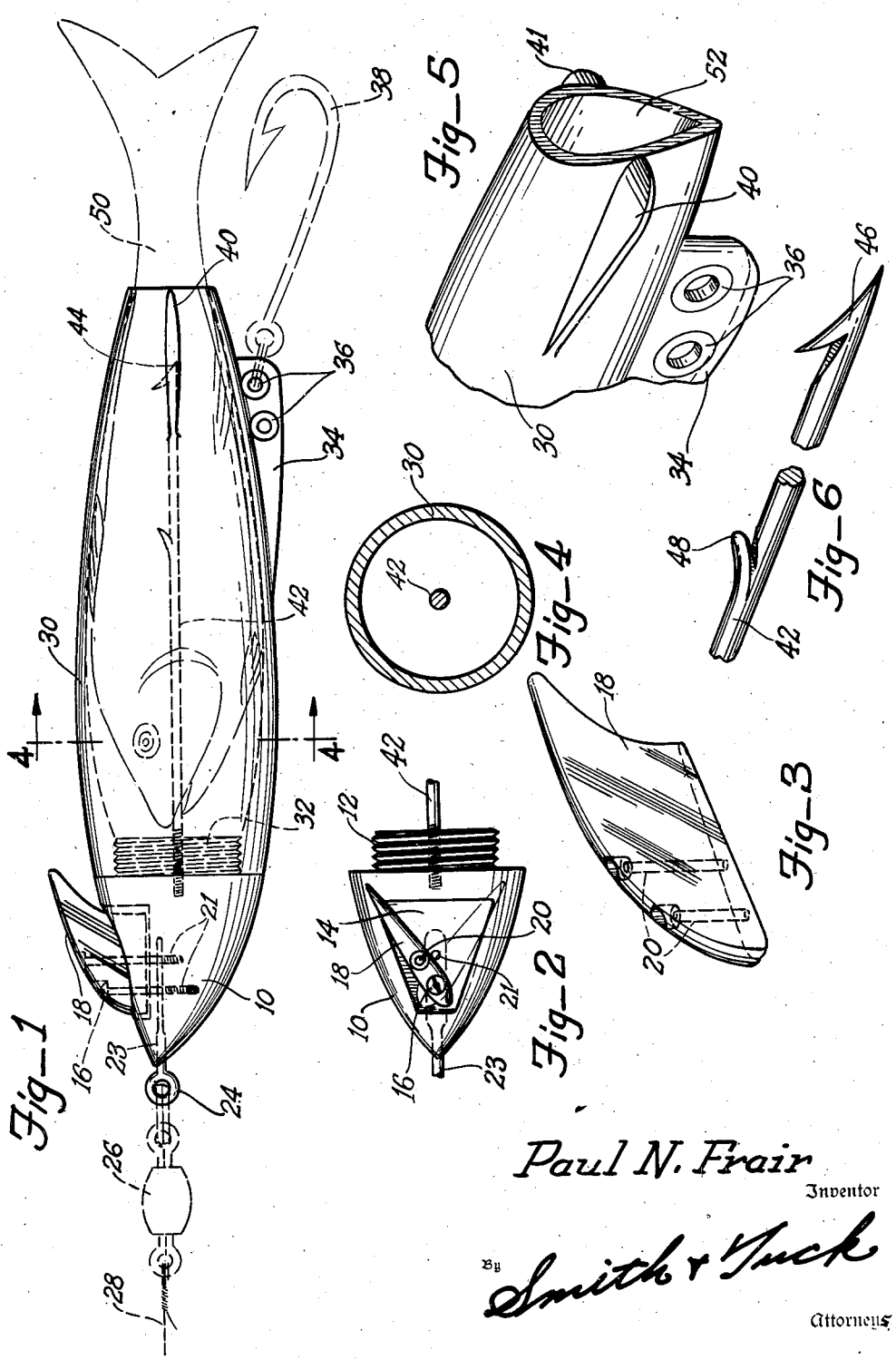

2,467,971

UNITED STATES PATENT OFFICE 2,467,971

TRANSPARENT FISHING BAIT HOLDER AND PROTECTOR

Paul N. Frair, Seattle, Wash.

Application April 25, 1947, Serial No. 743,830

2 Claims. (Cl. 43—41)

My present invention relates to the general art of fishing lures, and more particularly to a transparent fishing bait holder and protector.

In many forms of fishing for the larger fish, it has been found most satisfactory to use the natural food of those larger fish, but usually when the small herring and like types of fish are employed, the process of placing them on the fish hook gear and drawing them through the water soon distorts their conformation, and they no longer properly portray the natural fish food, thereby losing their attractiveness and effectiveness. With my present invention, I provide a plug-like body made of transparent material and so arranged as to hold the fish in a life-like position protected from damage and to have the tail portion of the fresh bait extending out beyond the end of the plug, so as to give the bait the maximum attractiveness for the game fish.

The principal object of my present invention, therefore, is to provide a transparent bait holder and protector which will substantially house the natural food of the fish that is sought.

A further object of my invention is to provide means for definitely positioning the fresh minnow or herring in a life-like position within the transparent body of my plug-like bait holder.

A further object of my present invention is to provide means whereby the tail end of the fresh bait may extend outside of my protective bait holder and give a semblance of the normal life-like swimming action of the bait.

A further object of my invention is to provide in the head end of my fresh bait holder an upstanding fin-like member of contrasting color which, as the plug is drawn through the water, will be constantly moving from side to side about its vertical pivot so as to further carry out the impression of a life-like fresh bait.

A further object is to provide a solid head, which may be of any desired color and a pivoted fin secured to said head which should be of a contrasting color.

Further objects, advantages and capabilities will be apparent from the description and disclosure in the drawings, or may be comprehended or are inherent in the device.

In the drawings:

Fig. 1 is a side elevation of my bait holder and protector in which the fresh bait and certain related parts, not forming part of this invention, are shown in dashed lines.

Fig. 2 is a top plan view of the head or leading end of my bait holder detached from the hollow body portion.

Fig. 3 is a perspective view showing the operating fin member employed at the head end of my bait holder, the same being shown on enlarged scale and detached.

Fig. 4 is a cross-sectional view taken along the line 4—4 of Fig. 1.

Fig. 5 is a perspective view showing, in fragmentary form, the rear portion of my bait holder.

Fig. 6 is a broken perspective view of the impaling rod which I use to insure proper and secure positioning of the fresh bait within my bait holder.

Referring more particularly to the disclosure in the drawings, the numeral 10 designates the nose or leading end of my bait holder. This I prefer to form of solid, plastic material which is provided with a threaded rearward extension 12, adapted to engage the hollow bait enclosing member of my holder. On the top portion of nose piece 10, I provide a recess 14, which, in plan view, is in the form of a truncated triangle, with the base portion toward the rear. Near the narrower end of recess 14, I provide a vertical pivot screw 16, upon which is loosely pivoted the oscillating fin member 18. By trial, I have gradually evolved the particular shape of the fin 18 as one that reasonably simulates a fish fin, and at the same time, has a shape which greatly assists in causing the fin to oscillate back and forth in a swimming action as the plug-like bait holder tends to oscillate as it is drawn through the water. It will be noted that the fin is streamlined in side elevation, and is provided with two pivot securing holes 20. Corresponding to holes 20 are tapped holes 21 in head member 10. By securing pivot screw 16 in the front or rear holes thus provided, the frequency of oscillation of fin 18 may be effectively controlled.

The same pivot screw that provides pivot 16 is passed through drilled holes in draft bar 23, which extends parallel to the longitudinal axis of the lure holder and terminates in the draft ring 24. To ring 24 it is common to attach a swivel as 26, to which, in turn, any suitable leader or line 28 may be secured. Attention is invited to the fact that the draft link is positioned above the longitudinal axis of the bait holder. This is a desirable arrangement in that it tends to draw the lure through the water with a nose-heavy action and this causes an impingement of the water on the upper surface and on the fin 18, and has been found to greatly assist in providing the normal swimming action of the fresh bait.

The bait holder proper as 30 is, in effect, a transparent envelope being of circular cross-section at its forward end and gradually changing to a tear-drop cross-section at its rear end, as is probably best illustrated in Fig. 5. Member 30, taken by itself, is thus open at both its ends.

At its forward end, envelope 30 is provided with female threads, as at 32, which are adapted to engage the external threads 12 on the nose piece, and thus to be held in secure alignment with the nose piece, and by properly designed threads, the longitudinal axis of the tear-drop section shown in Fig. 5 will be parallel to the axis of pivot 16, and the fin 18 when it lies on the longitudinal axis of the device. At its rear end, envelope 30 is provided, at its lower-most portion, with an outstanding fin as 34, in which is provided a plurality of preferably reinforced eyelets 36, to which various types or numbers of hooks may be secured. In the illustration, I have shown a single hook at 38. However, many other arrangements are well known to fishermen, and each seems to prefer his own arrangement. Consequently, I prefer to provide means whereby the fisherman can rig his lure as desired.

On the horizontal axis and at the rear end of envelope 30, I provide two outwardly directed fins, as 40 and 41. It will be noted that, at their rear ends, these fins stand outwardly from the envelope considerably, and at their forward end merge with the body of envelope 30. Throughout their entire length, however, they are on the horizontal axis of the envelope. They thus provide rear stabilizers, or horizontal rudders which, when it is remembered that the lure goes through the water in a nose-heavy fashion, the water will impinge on these rear surfaces and the effect will be to lower the rear end of the lure. Then, as soon as the downward movement has been accomplished, the draft link with its high position, will again take over, so that we have an oscillating movement that is continuous throughout the trolling of the lure. This again adds greatly to the life-like appearance of the lure, and by the weight of the hook 38 and the high attachment of the draft link assists in maintaining the lure on a vertical plane substantially as shown in Fig. 1 except that it will oscillate longitudinally in its swimming gyrations.

In order to provide means for holding the body of the fresh bait particularly in a definite and life-like position, I provide an impaling pin 42, which is preferably threaded, or otherwise secured, into nose member 10, and extends rearwardly to a point indicated at 44, in Fig. 1. Referring to Fig. 6, I provide on the extreme end of pin 42 a sharp barbed point as 46, and then substantially midway within envelope 30 I provide a second barb as 48, which is oppositely faced from barb 46, and is preferably formed after the showing of Fig. 6, with a very rounded barbed tip, as distinct from the usual sharp-tipped barb as shown at 46, which is common in fish hooks generally. This form has been found best for passing through the body of the herring or other fresh bait, as it will hold the herring against forward displacement, but will not unnecessarily mangle the meat as it is put in place.

In using my bait holder and protector, the first action required is to unscrew threads 12 and 32 so that the nose piece can be entirely removed from the envelope portion 30. This makes it possible then to place the fresh bait or minnow 50 definitely in position on pin 42, and this should be done in the form substantially as shown in Fig. 1, where the nose of the bait does not quite touch the solid portion of the rear-extending threaded portion 12 of the nose piece. The fresh bait is then entered into the cavity of envelope 30, tail first, and by means of shaking or slightly twisting the same, the tail portion of the live bait can be pushed out through the tear-drop opening 52 in envelope 30. Nose piece 10 is then screwed onto envelope 30 and the bait is ready to fish. I have found it desirable that rod 42 be straight in order that the twisting of rod 42 within the bait will not unnecessarily mangle the same as the nose piece is threaded into place.

It is believed that it will be clearly apparent from the above description and the disclosure in the drawings that the invention comprehends a novel construction of a transparent fishing bait holder and a protector.

Having thus disclosed the invention, I claim:

1. A fishing bait holder comprising: a solid nose of substantially paraboloidal form having a recess on its upper side; a draft member secured in the apex of said nose; a fin pivotally mounted in said recess and having a plurality of pivot-engaging holes; said nose having a plurality of pivot-receiving threaded holes; a pivot pin adapted to selective engagement in said pivot engaging holes; threaded attachment means on the rear of said nose; an impaling pin co-axially secured in said nose, having oppositely faced barbs and extending rearwardly; a transparent envelope adapted to be secured, by screw threads, to said nose attachment means and having an open rear end of the shape of the cross-section of a fish's body; horizontally disposed fins secured to the rear of said envelope and means for securing a fish hook to said envelope.

2. A fishing bait holder comprising: a solid nose of substantially paraboloidal form; a draft member secured in the apex of said nose; said nose having a recess on its upper side having the form of a truncated triangle in horizontal projection; a pivoted fin mounted in said recess having a vertically disposed pivot-engaging hole; said nose having a pivot-receiving threaded hole; a pivot pin adapted to engagement in said pivot engaging hole; attachment means on the rear of said nose; a barbed impaling pin co-axially secured in said nose and extending rearwardly; a transparent envelope adapted to be secured to said nose attachment means and having an open rear end of the shape of a lemniscate loop; horizontally disposed fins secured to the rear of said envelope and means for securing a fish hook to said envelope.

PAUL N. FRAIR.

REFERENCES CITED

The following references are of record in the file of this patent:

UNITED STATES PATENTS

| Number | Name | Date |
|---|---|---|
| 556,494 | Dales | Mar. 17, 1896 |
| 865,683 | Credlebaugh | Sept. 10, 1907 |
| 1,814,450 | Nelson | July 14, 1931 |

FOREIGN PATENTS

| Number | Country | Date |
|---|---|---|
| 23,482 | Great Britain | 1899 |
| 468,605 | Great Britain | July 8, 1937 |
| 483,262 | Great Britain | Apr. 14, 1938 |
| 4,504 | Austria | June 25, 1901 |